United States Patent [19]

Fushimi et al.

[11] Patent Number: 4,934,473
[45] Date of Patent: Jun. 19, 1990

[54] MOTOR DRIVEN POWER STEERING APPARATUS

[75] Inventors: Takehiko Fushimi; Hiroshi Nakashima, both of Aichi, Japan

[73] Assignee: Aisin Seiki Kabushiki Kaisha, Aichi, Japan

[21] Appl. No.: 316,743

[22] Filed: Feb. 28, 1989

[30] Foreign Application Priority Data

Feb. 29, 1988 [JP] Japan .................................. 63-048282

[51] Int. Cl.⁵ .............................................. B62D 5/04
[52] U.S. Cl. ................................ 180/79.1; 364/424.05
[58] Field of Search .................. 180/79.1; 364/424.01, 364/424.05

[56] References Cited

U.S. PATENT DOCUMENTS 4,789,040 12/1988 Morishita et al. ............... 180/79.1 X

FOREIGN PATENT DOCUMENTS 8806546 9/1988 European Pat. Off. ........... 180/79.1
2204006 11/1988 United Kingdom ............... 180/79.1

Primary Examiner—Mitchell J. Hill
Attorney, Agent, or Firm—Sughrue, Mion, Zinn, Macpeak & Seas

[57] ABSTRACT

A motor driven power steering apparatus includes a steering mechanism having a torque detector for detecting torque applied to the mechanism through a steering wheel. An electric motor is connected to the steering mechanism through an electromagnetic clutch. The current in the electric motor is monitored and if it becomes excessive, a control circuit is activated to deactivate the clutch. The electric motor is disconnected from the steering mechanism at the time the engine of the vehicle is starting and at other times during operation of the vehicle to determine if excess current flows through the motor which would be indicative of a malfunction of the electric motor.

6 Claims, 5 Drawing Sheets

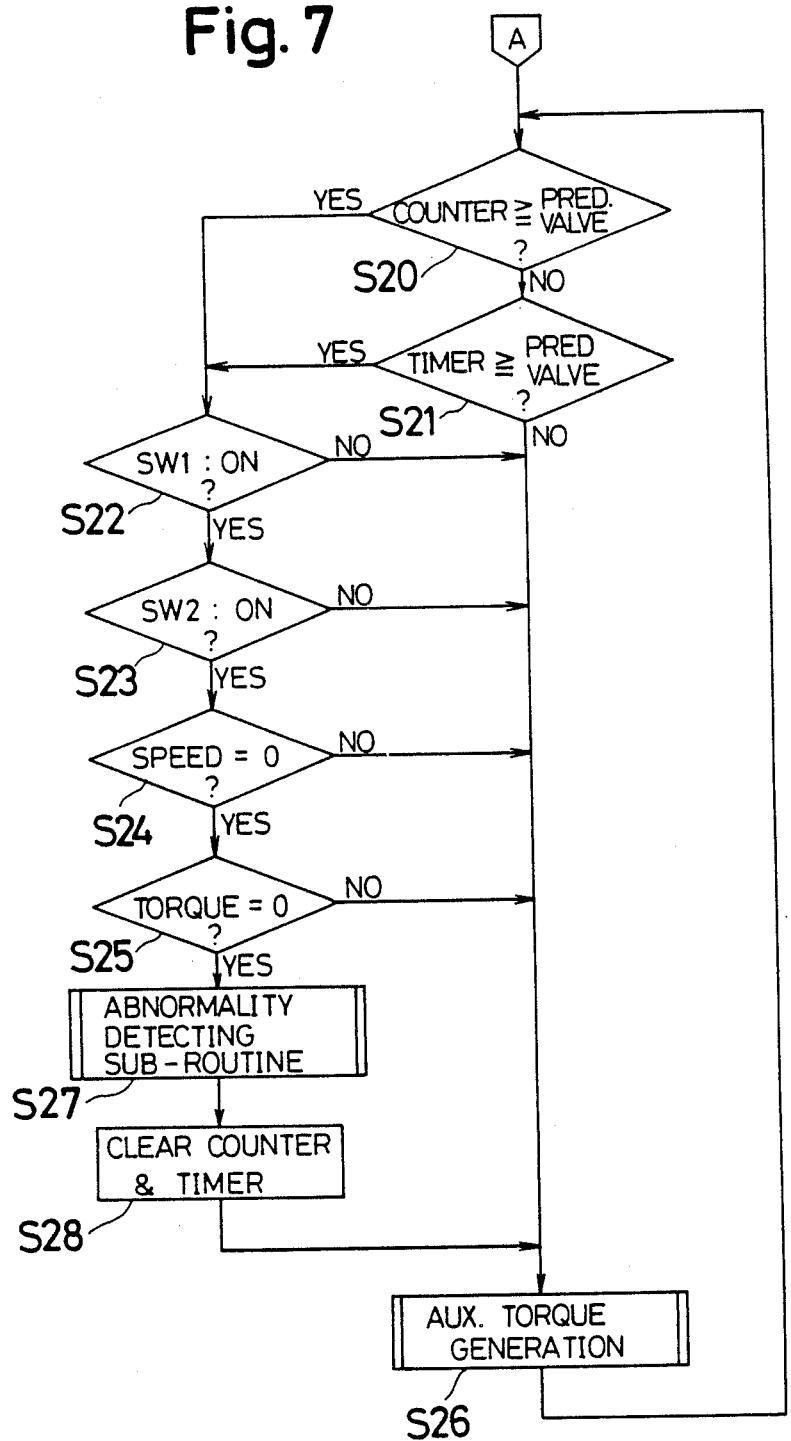

MOTOR DRIVEN POWER STEERING APPARATUS

BACKGROUND OF THE INVENTION

This invention relates to a motor driven steering apparatus.

Japanese Kokai Publication No. 61-9370, published on January 16, 1986, discloses a conventional motor driven power steering apparatus. This apparatus comprises an input shaft connected with a steering wheel, an output shaft connected with road wheels, a torque detector for detecting an applied steering torque between the input and the output shafts, an electric motor for generating an auxiliary torque, an electromagnet clutch for selectively connecting the electric motor with the output shaft, and, an electric power controller for controlling magnitude and direction of the auxiliary torque based on the steering torque detected by the torque detector. The electromagnet clutch connects the electric motor with the output shaft whenever the torque detector detects a steering torque. At the same time, the electric motor generates proper auxiliary torque based on the detected steering torque. As a result, the output shaft is rotated with larger torque than the input shaft. Thus, a driver can handle the steering wheel lightly and easily.

The electric motor may be locked mechanically when a magnet is disconnected from a motor housing, when a brush unit is disconnected from the motor housing, or some other accident. If the electric motor is locked, the steering wheel may be locked, hence the electromagnet clutch connects to the locked motor with the output shaft when the steering wheel is rotated.

SUMMARY OF THE INVENTION

Accordingly, one of the objects of this invention is to obviate the above conventional drawbacks.

It is also an object of this invention to detect a malfunction of an electric motor associated with the power steering apparatus.

It is a further object of this invention to prevent the steering wheel from locking upon failure of the electric motor.

To achieve the above objects, and in accordance with the principles of the invention as embodied and broadly described herein, the motor driven power steering apparatus comprises a steering mechanism for changing a direction of the vehicle; torque detecting means for detecting steering torque applied to a steering wheel; auxiliary torque generating means for generating an auxiliary torque; clutch means for connecting and disconnecting the auxiliary torque generating means to the steering mechanism; control means for controlling both magnitude and direction of the generated auxiliary torque in response to the detected steering torque; excessive current detecting means for detecting an excessive current flowing through the auxiliary torque generating means; clutch releasing means for activating the clutch means in order to disconnect the auxiliary torque generating means from the steering mechanism; and malfunction detecting means for detecting a malfunction of the auxiliary torque generating means. Further, the malfunction detecting means detects the malfunction by following steps of: disconnecting the auxiliary torque generating means from the steering mechanism by the clutch releasing means; generating an auxiliary torque by the auxiliary torque generating means; and determining if an excessive current flows through the auxiliary torque generating means.

BRIEF DESCRIPTION OF THE DRAWINGS

The accompanying drawings, which are incorporated in and constitute a part of the specification, illustrate an embodiment of the invention, and together with the description, serve to explain the principles of the invention wherein:

FIGS. 6 and 7 are flowcharts showing a main program executed in an electronic controlling means in accordance with this invention.

DETAILED DESCRIPTION OF A PREFERRED EMBODIMENT

Reference will now be made in detail to the present preferred embodiment of the invention, an example of which is illustrated in the accompanying drawings.

Figure 2:
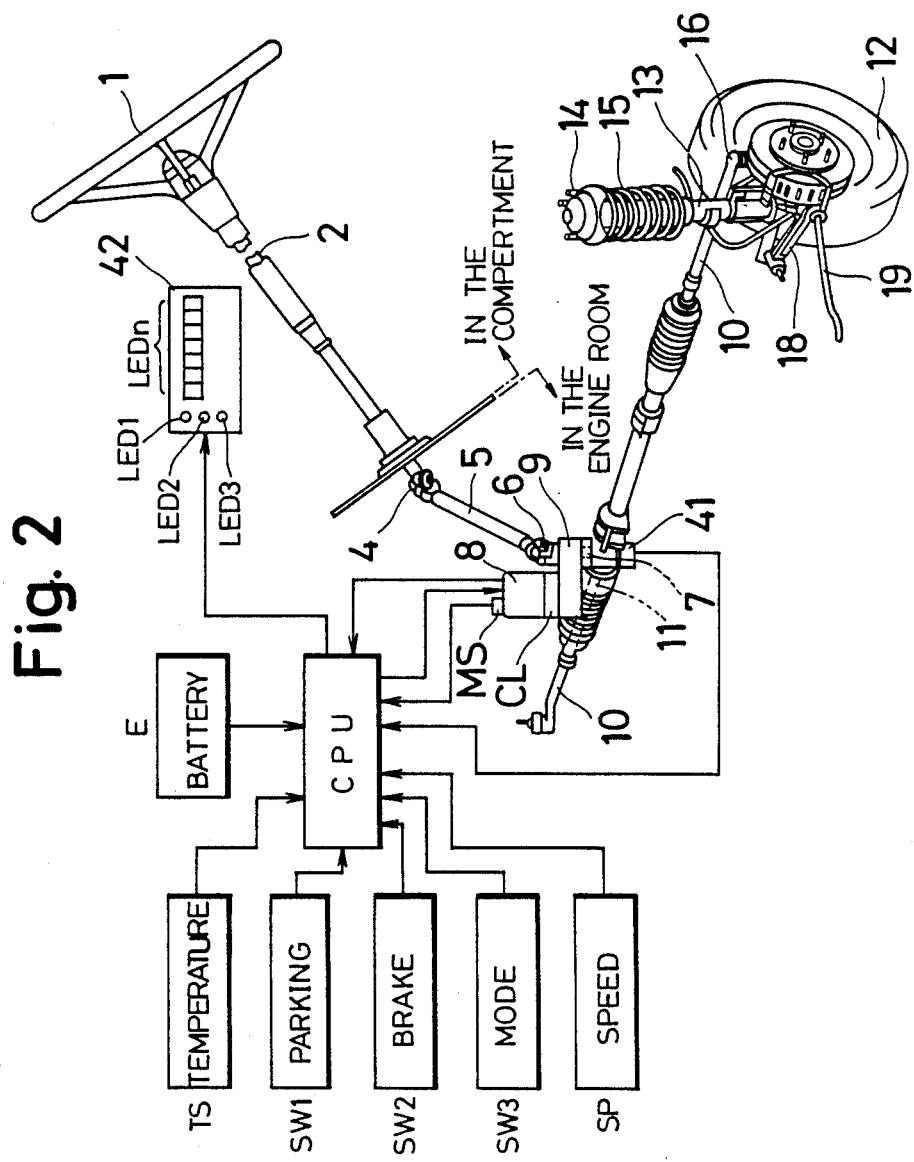
FIG. 2 is a block diagram showing a general construction of a motor driven power steering apparatus in accordance with this invention.
Figure 3:
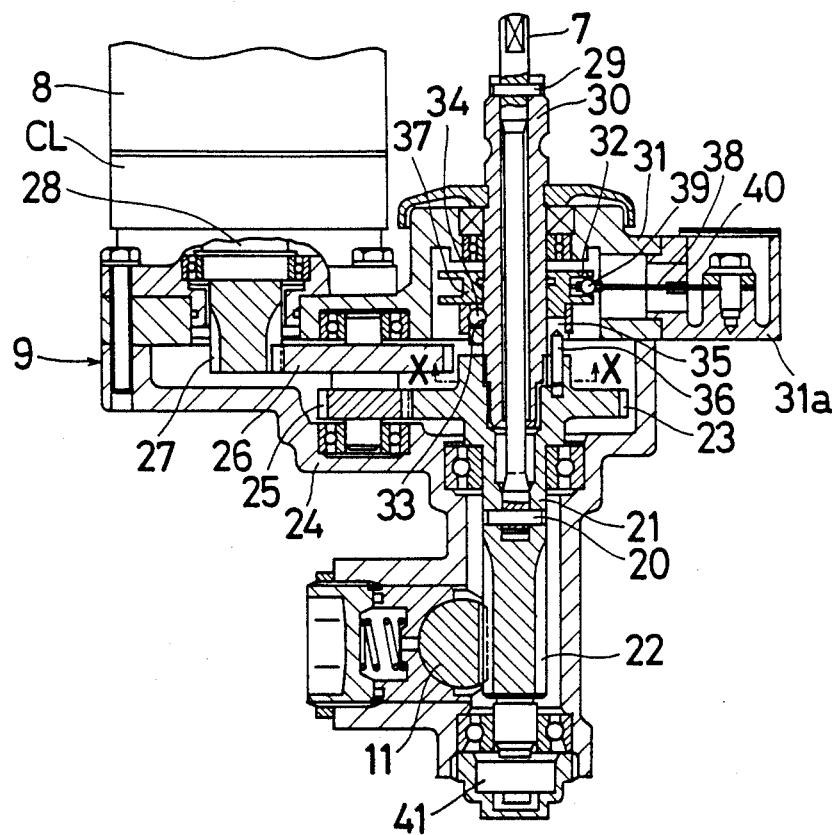
FIG. 3 is a cross sectional view showing an auxiliary torque supplying means in accordance with this invention.
Figure 4:
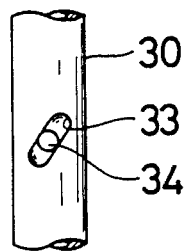
FIG. 4 is a partial front view showing a sleeve in accordance with this invention.

Referring now to FIGS. 2 and 3, the mechanical construction of this embodiment will be explained.

A steering wheel 1 is connected with a first steering shaft 2. The first steering shaft 2 is linked with the second steering shaft 5 through a first universal joint 4. The second steering shaft 5 is linked with a rod 7 through a second universal joint 6. The rod 7 is inserted into the sleeve 30. An upper end of the sleeve 30 is fixed to the rod 7 by a pin 29. The sleeve 30 is rotatably supported by a case 31. The rod 7 is also fixed to an output shaft 21 by a pin 20.

One end of the output shaft 21 has a pinion gear 22. The pinion gear 22 is engaged with a rack 11 which is fixed to the tie rod 10. The tie rod 10 is linked with a steering knuckle arm 16 for road wheels 12. The road wheels 12 are supported by shock absorbers 13. The shock absorbers 13 are fixed to a vehicle body (not shown) through a suspended upper support 14. There are coil springs 15 between the road wheels 12 and the suspended upper supports 14. The road wheels 12 are also supported by lower suspension arms 18. A stabilizer bar 19 is fixed to and between the lower suspension arms 18.

Accordingly, when the steering wheel 1 is rotated, the output shaft 21 is rotated through the first steering shaft 2, the first universal joint 4, the second steering shaft 5, the second universal joint 6 and rod 7. At this time, the pinion gear 22 is rotated and the rack 11 travels in a perpendicular direction with respect to the plane of the sheet of FIG. 3, i.e. extending direction of the tie rod 10 in FIG. 2. Thus, the direction of the road wheels 12 is changed.

Further, a ring gear 23 is formed integrally with the output shaft 21. The ring gear 23 is engaged with a middle gear 25 which is rotatably mounted on the case 24. The middle gear 25 is formed integrally with the other middle gear 26. The middle gear 26 is further engaged with an input gear 27. The input gear 27 is fixed to an output shaft 28 of an electromagnet clutch CL. While the electromagnet clutch CL is connected, an auxiliary torque is transmitted to the input gear 27 from an electric motor 8. However, while the electromagnet clutch CL is disconnected, only the steering torque which is applied to the steering wheel 1 is transmitted to the output shaft 21, hence the auxiliary torque from the electric motor 8 is not transmitted to the input gear 27.

An axially movable member 32 is slidable on the sleeve 30. A pin 36, which is fixed to the output shaft 21, is inserted into the axially movable member 32. The axially movable member rotates with the output shaft 21, hence the pin 36 restricts a rotation of the axially movable member 32. A groove 33 is inclined with respect to the axial direction of the sleeve 30. The groove 33 has a hemispherical bottom and a ball 34 is located in the groove 30. The ball 34 is supported by the axially movable member 32.

While the steering torque is transmitted to the rod 7, a twist is generated in the rod 7 in proportion to road reaction force which is applied to the road wheels 12. When the twist is generated in the rod 7, a mutual difference of the rotational angle is generated between the sleeve 70 and the output shaft 21. This mutual difference of rotational angle is converted into an axial movement of the axially movable member 12 by the inclined groove 30 and the ball 34.

Figure 5:
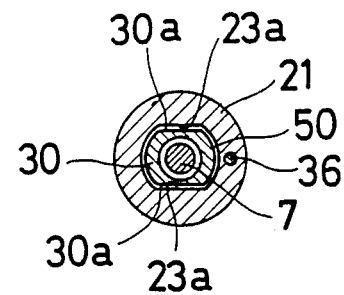
FIG. 5 is a cross sectional view taken on the line X—X in FIG. 3.

As shown in FIG. 5, there is a space 50 available between the sleeve 30 and the output shaft 21. Parallel planes 30a and 23a are opposed to each other within the space 50. A dimension of this space 50 restricts the mutual difference of the rotational angle. Accordingly, the axially movable member 32 travels in the axial direction of the sleeve 30 within a predetermined torque range.

The axially movable member 32 has an annular groove 37. In this groove 37, a ball 39 is inserted. The ball 39 is supported by one end of a cantilever 38. The other end of the cantilever 38 is fixed to the case 31a which is connected to the case 31. Strain gauges 40 are adhered to the cantilever 38. The strain gauges 40 are comprised of resistive elements r1, r2, r3, r4. When the axially movable member 32 travels, the resistance of the strain gauges 40 changes in proportion to the traveling dimension of the axially traveling member 32.

As described above, the resistance of the strain gauges 40 shows a linear transition within a predetermined range in proportion to the applied steering torque, and also shows a saturated transition without the predetermined range, hence the traveling dimension of the axially movable member 32 is restricted.

Further, a steering angle detector 41 is connected with one end of the pinion gear 22. This steering angle detector 41 detects the direction of the road wheels 12.

Figure 1:
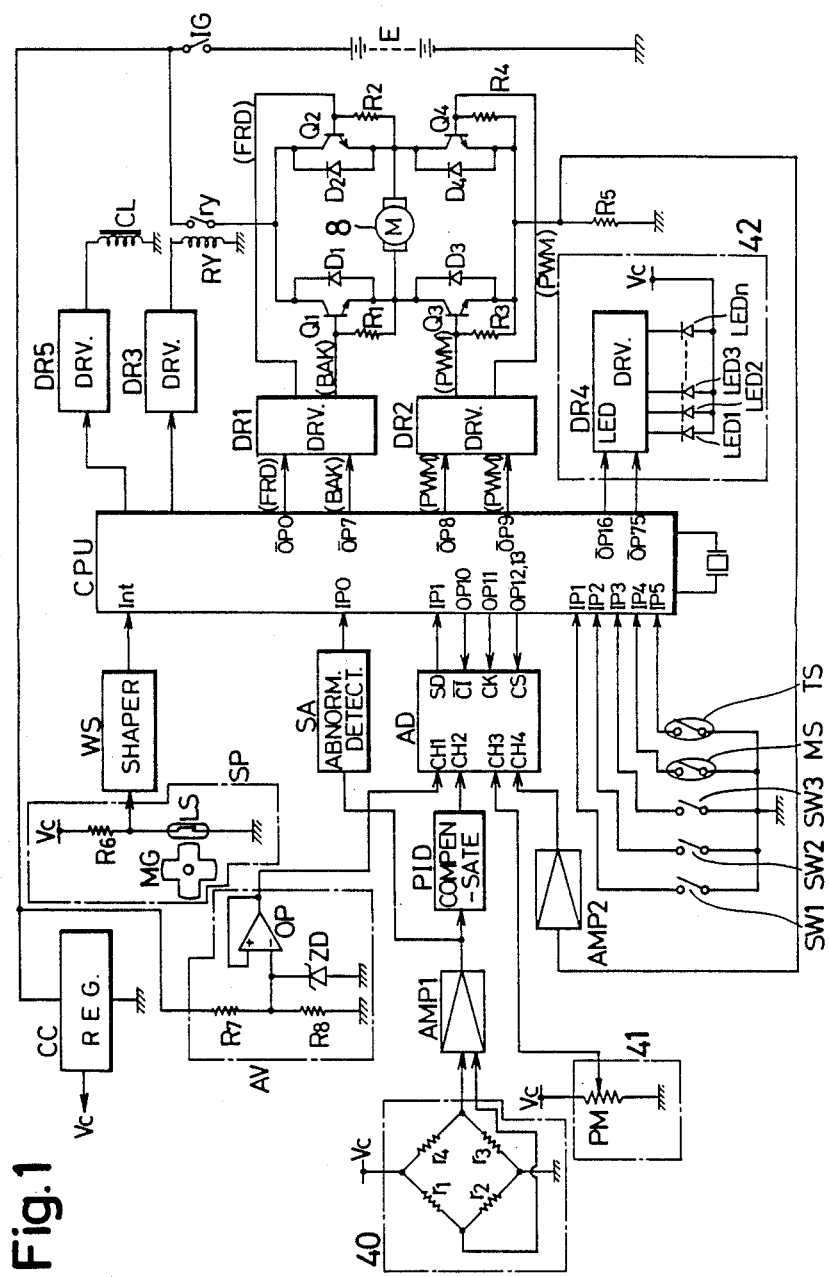
FIG. 1 is a circuit diagram showing an electronic controlling means in accordance with a motor driven power steering apparatus of this invention.

The motor driven power steering apparatus of this embodiment is controlled by an electronic controller as shown in FIG. 1. The electronic controller includes a central processing unit CPU. The central processing unit CPU includes RAM (random access memories), ROM (read only memories), a timer and a counter. The timer measures an elapsed time after the last execution in step S28. The counter measures a running distance of the vehicle after the last execution in step S28. Electric power is supplied to the central processing unit CPU from a voltage regulating circuit CC. A speed sensor SP is electrically connected with the central processing unit CPU through wave-form shaping circuit WS. The speed sensor SP comprises a magnet MG which rotates in proportion to the vehicle speed, lead switch LS and a resistor R6. Further, an abnormality detecting circuit AV is electrically connected with the central processing unit CPU through an A/D converter AD. The abnormal voltage detecting circuit AV detects a shortage of the supplied voltage. The abnormal voltage detecting circuit AV comprises resistors R7 and R8, a zener diode ZD and an operational amplifier OP.

The strain gauges (40) are electrically connected with the central processing unit CPU through an amplifier AMP1, a compensating circuit PID and the A/D converter AD. The strain gauges 40 are also connected with the central processing unit CPU through a sensor abnormality detecting circuit SA.

A compensating circuit PID compensates a mechanical delay, and also cancels the vibration of the steering torque. The sensor abnormality detecting circuit SA observes whether or not the output signal from the amplifier AMP1 is in a predetermined normal range or not.

The steering angle sensor 41 is connected with the central processing unit CPU through the A/D converter AD. Further, the magnitude of current flowing through the motor 8 is detected by a resistor R5 as ohmic voltage. The ohmic voltage is amplified by an amplifier AMP2 and is supplied to the central processing unit CPU through the A/D converter AD.

A parking position switch SW1, a parking brake switch SW2, a mode selecting switch SW3, a motor temperature sensor MS and a transistor temperature sensor TS are electrically connected with the central processing unit CPU. The parking position switch SW1 detects the parking position of a vehicular transmission (not shown). The parking brake switch SW2 detects the braking condition of a parking brake (not shown). The mode selecting switch SW3 selects an optional mode for returning a steering wheel 1 to the neutral position when the vehicle engine starts. The motor temperature sensor MS detects the temperature of the motor 8 in order to prevent excessive heating of the motor 8. The transistor temperature sensor TS detects the temperature of output transistors Q1, Q2, Q3 and Q4 in order to prevent excessive heating of the output transistors Q1, Q2, Q3 and Q4.

A relay RY is connected with the central processing unit CPU through a relay driving circuit DR3. Accordingly, the central processing unit (CPU is capable of turning on and off a contact ry of the relay RY selectively. Whenever the central processing unit CPU turns off the contact ry, the motor 8 must be stopped under any condition, hence no electric power is supplied to the motor 8. When the motor 8 generates excessive heat or when the output transistors Q1, Q2, Q3 and Q4 generate excessive heat, the central processing unit CPU turns off the contact ry of the relay RY immediately.

An electromagnet clutch CL is connected with the central processing unit CPU through clutch driving circuit DR5. Accordingly, the central processing unit CPU is capable of connecting the clutch CL selectively in order to connect the motor 8 with the output shaft 21.

When the motor 8 rotates in the forward direction, the output transistors Q1 and Q4 are turned on. When the motor 8 rotates in reverse, the output transistors Q2 and Q3 are turned on. The transistors Q1 and Q2 are controlled by a central processing unit CPU through a drive circuit DR1 in order to determine the rotational direction of the motor 8. Further, the transistors Q3 and Q4 are controlled by a central processing unit CPU through a drive circuit DR2 in order to determine the rotational direction and the magnitude of the auxiliary torque of the motor 8. Accordingly, central processing unit CPU supplies the direction representing signals FRD and BAK to the transistors Q1 and Q2 and supplies a pulse width modulating signal PWM which represents the magnitude of the auxiliary torque.

Four diodes D1, D2, D3 and D4 are connected in parallel with the transistors Q1, Q2, Q3 and Q4 in order to protect the transistors Q1, Q2, Q3 and Q4 from reverse voltages.

A steering angle display 42 is electrically connected with the central processing unit CPU. The steering angle display 42 comprises an LED driving circuit DR4 and a plurality of light emitting diodes LED1-LEDn.

Figure 6:
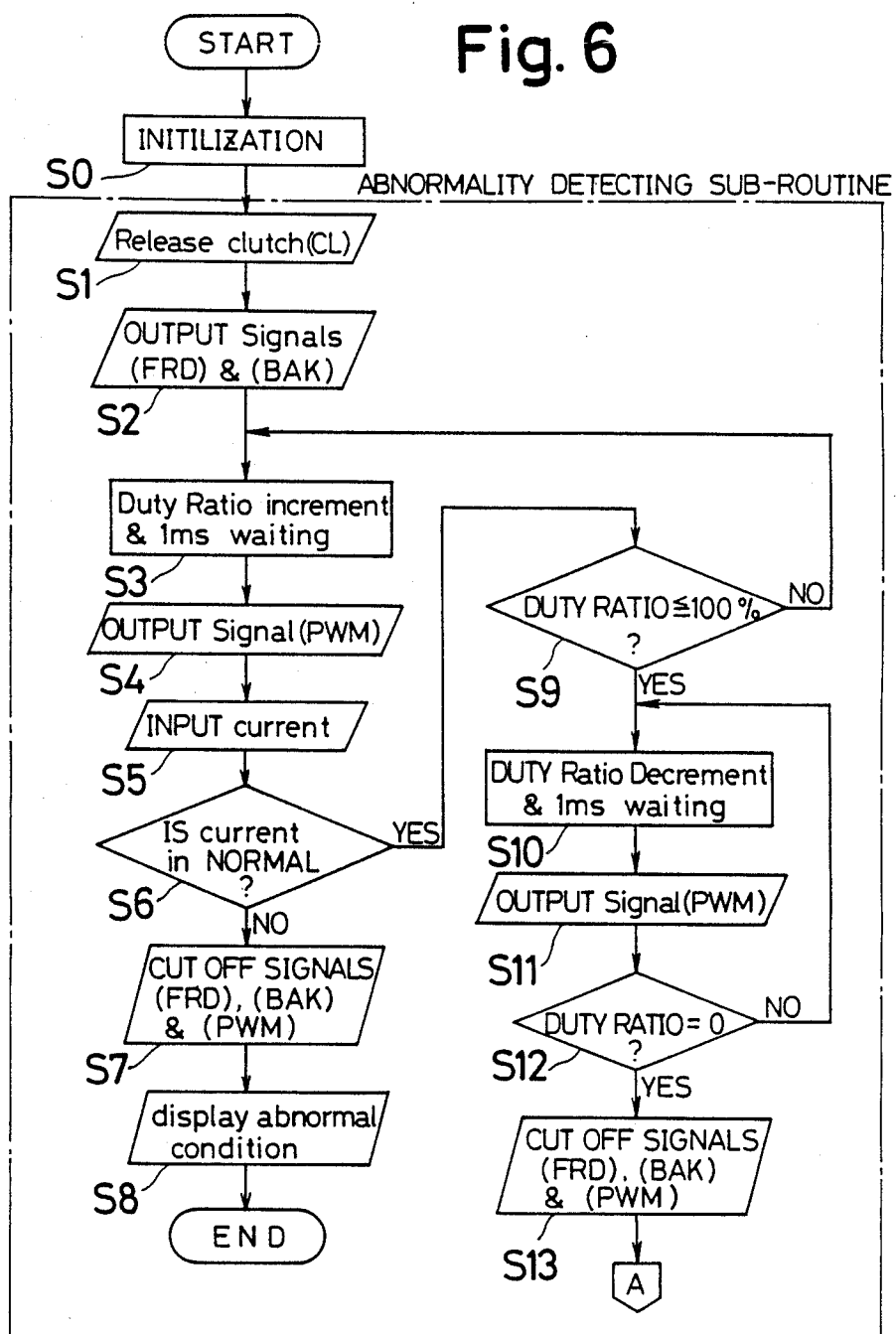

The electronic controlling unit shown in FIG. 1 is controlled by a stored program. FIGS. 6 and 7 illustrate this program. The central processing unit CPU executes the program from step S0 after turning on an ignition switch IG. In this program, there are three general procedures. One is a procedure for initialization, which comprises step S0. The other is a procedure for detecting an abnormal condition of the motor 8 at an initial time, which is comprised from step S1 to step S13. Another procedure is for detecting an abnormal condition of the motor 8 during an operating time of the motor driven power steering apparatus, which is comprised from step S20 to step S26.

In step S0, initialization is executed. Under the initialization, the RAM and the peripheral circuits AD, 42, DR1, DR2, DR3 and DR5 etc. are initialized in order to execute the subsequent procedure correctly. However, the counter for measuring the running distance and the timer for measuring the elapsed time are not initialized in order to maintain the stored data.

Next, step S1 is executed. In step S1, the electromagnet clutch CL is released. Accordingly, the motor 8 is disconnected from the output shaft 21 after executing step S1.

Next, steps S2, S3 and S4 are executed. In step S2, the rotational direction of the motor 8 is determined to be forward or backward alternatively. In step S3, the pulse width modulating duty is increased after waiting 1 msec. In step S4, the rotational direction and the pulse width modulating duty are supplied from the central processing unit CPU as the direction representing signals FRD and BAK and the pulse width modulating signal PWM. After executing step S4, the motor 8 starts rotating forward or backward. However, the auxiliary torque is not transmitted to the output shaft 21, hence the electromagnet clutch CL is released.

Next, steps S5 and S6 are executed. In step S5, the magnitude of the current flowing through the motor 8 is input. The magnitude of the current is changed in response to a load on the motor 8. Accordingly, while the motor 8 is in normal condition, the magnitude of the current never exceeds a predetermined value even if the pulse width modulating signal PWM is maximized. So, in step S6, the magnitude of the current is compared with the predetermined value. If the motor 8 is in normal condition, the result of the comparison becomes "YES" and the procedure from step S9 to step S26 is executed If the motor 8 is in an abnormal condition such as a locked condition, the result of the comparison becomes "NO" and the procedure comprising steps S7 and S8 is executed.

The procedure of steps S7 and S8 is executed in order to halt the program when the magnitude of the current exceeds the predetermined value. In step S7, the direction representing signals FRD and BAK and the pulse width modulating signal PWM are cut off in order to stop the motor 8 immediately. In the step S8, the steering angle display 42 is driven in order to display the abnormal condition. Then the program is halted but the LED driving circuit DR4 continues the abnormal display by itself. The clutch driver DR5 maintains the electromagnet clutch CL in the released condition.

In step S9, a determination is executed as to whether or not the pulse width modulating duty reaches 100%. If the determination is "NO" (i.e. if the pulse width modulating duty has not yet reached 100%), then step S3 is executed again. Accordingly, the above described procedure from step S3 to step S6 is executed until the pulse width modulating duty reaches 100%.

Next, steps S10, S11, S12 and S13 are executed. In step S10, the pulse width modulating duty is decreased after waiting 1 msec. In step S11, the pulse width modulating duty is supplied from the central processing unit CPU as a pulse width modulating signal PWM. In step S12, a determination is executed whether or not the pulse width modulating signal PWM reaches 0%. If the determination is "NO" i.e. if the pulse width modulating duty has not yet reached 0%, then step S10 is executed again. Accordingly, the above described procedure from step S10 to step S11 is executed until the pulse width modulating duty reaches 0%. In step S13, the direction representing signals FRD and BAK and the pulse width modulating signal PWM are cut off in order to stop the motor 8.

Next, steps S20 and S21 are executed. In step S20, the data stored in the counter is compared with a predetermined value. The determination becomes "YES" periodically at the time when the vehicle runs a certain distance corresponding to the predetermined value. In step S21, the data stored in the time is compared with a predetermined value. The determination becomes "YES" periodically at a regular interval of time corresponding to the predetermined value.

When the determination in steps S20 and S21 becomes "NO", step S26 is executed in order to generate the proper auxiliary torque. The motor 8 applies the proper auxiliary torque to the output shaft 21 through electromagnetic clutch CL during step S26.

When at least one of the determinations in steps S20 and S21 becomes "YES", determinations from step S22 to step S25 are executed in order to check a stoppage of the vehicle.

In step S22, a determination is made whether or not the parking position switch SW1 is turned on. If the determination is "NO" i.e. if the switch SW1 is turned off, the vehicle may be running. Therefore, step S26 is executed in order to generate the proper auxiliary torque.

In step S23, a determination is made whether or not the parking brake switch SW2 is turned on. If the determination is "NO" i.e. if the switch SW2 is turned off, the vehicle may be running. Therefore, step S26 is executed in order to generate the proper auxiliary torque.

In step S24, a determination is made whether or not the vehicle speed, which is detected by the speed sensor SP, is zero. If the determination is "NO" i.e. if the vehicle speed is not zero, the vehicle may be running.

Therefore, step S26 is executed in order to generate the proper auxiliary torque.

In step S25, a determination is made whether or not the steering torque, which is detected by the strain gauges 40, is zero. If the determination is "NO" i.e. if the steering torque is not zero, auxiliary torque is required. Therefore, step S26 is executed in order to generate the proper auxiliary torque.

A motor abnormality detecting sub-routine is called and executed in step S27. The motor abnormality detecting sub-routine is the same procedure as the procedure comprised by steps S1 to S13. Accordingly, a detailed explanation for the motor abnormality detecting sub-routine is omitted.

Next, step S28 is executed. In step S28, the counter and the timer are initialized in order to be ready for the next period.

As described above, the motor abnormality is checked not only initially when the ignition switch is turned on, but also during operating of the motor driven power steering apparatus in this embodiment. Therefore, the abnormal condition can be detected more quickly and reliably.

Further, when an abnormality is detected, the electromagnet clutch CL is maintained in released condition. Therefore, the steering wheel 1 can be rotated manually without obstruction by the locked motor 8.

Furthermore, when the electromagnet clutch CL cannot be released, the magnitude of the motor 8 current also exceeds the predetermined value. Accordingly, a malfunction of the electromagnet clutch CL can also be detected by this embodiment.

The pulse width modulating signal PWM is increased gradually in this embodiment. Therefore, the malfunction of the motor 8 is not expanded, hence an excessive current never flows in the motor 8.

Meanwhile, the electromagnet clutch CL is utilized in this embodiment. However, a mechanical clutch (not shown) can also be utilized for this invention. A mechanical clutch which connects and disconnects the motor 8 with the output shaft 21 in response to the applied steering torque can also be used in this embodiment.

Various modifications may be made in the invention without departing from the scope or spirit of the invention.

What is claimed is:

1. A motor driven power steering apparatus comprising:
   a steering mechanism for changing direction of road wheels;
   torque detecting means for detecting a steering torque applied to a steering wheel;
   auxiliary torque generating means for generating an auxiliary torque;
   clutch means for connecting and disconnecting the auxiliary torque generating means to the steering mechanism;
   control means for controlling magnitude and direction of the generated auxiliary torque in response to the detected steering torque;
   excessive current detecting means for detecting excessive current flowing through the auxiliary torque generating means;
   clutch releasing means for activating the clutch means in order to disconnect the auxiliary torque generating means from the steering mechanism; and
   malfunction detecting means for detecting a malfunction of the auxiliary torque generating means,
   wherein the malfunction detecting means detects the malfunction by disconnecting the auxiliary torque generating means from the steering mechanism by the clutch releasing means;
   generating an auxiliary torque by the auxiliary torque generating means; and
   determining if an excessive current flows through the auxiliary torque generating means.

2. The apparatus as set forth in claim 1, wherein the malfunction detecting means operates when power is supplied to the control means.

3. The apparatus as set forth in claim 1, wherein the malfunction detecting means operates when a predetermined time is elapsed.

4. The apparatus as set forth in claim 1, wherein the malfunction detecting means operates when a predetermined distance is run.

5. The apparatus as set forth in claim 1, wherein malfunction detecting means further includes a display means for displaying the malfunction.

6. The apparatus as set forth in claim 1, wherein said clutch means is an electromagnetic clutch.

* * * * *